US005343556A

United States Patent [19]

Silverberg

[11] Patent Number: 5,343,556

[45] Date of Patent: Aug. 30, 1994

[54] SYSTEM FOR ADDRESSING ENVELOPES

[75] Inventor: Morton Silverberg, Westport, Conn.

[73] Assignee: Pitney Bowes Inc., Stamford, Conn.

[21] Appl. No.: 747,581

[22] Filed: Aug. 20, 1991

[51] Int. Cl.$^5$ .......... G06F 15/00

[52] U.S. Cl. .......... 395/111; 395/117

[58] Field of Search .......... 395/117, 111, 101; 271/287–298; 355/308, 321, 325, 323; 358/498; 346/134

[56] References Cited

U.S. PATENT DOCUMENTS

| | | | |
|---|---|---|---|
| 4,524,691 | 6/1985 | Miller | 101/232 |
| 4,603,846 | 8/1986 | Miles | 271/2 |
| 4,625,651 | 12/1986 | Theurer | 104/7.2 |
| 4,731,741 | 3/1988 | Allen | 364/518 |
| 4,807,805 | 2/1989 | Rutkowski | 229/69 |

FOREIGN PATENT DOCUMENTS

| | | | |
|---|---|---|---|
| 0095737 | 7/1983 | European Pat. Off. | B07C 3/18 |

OTHER PUBLICATIONS

Hoffman Eitle & Partner, Search Report, Ref. No. 57 672 a/fi, Mar. 11, 1993.

*Primary Examiner*—Arthur G. Evans

*Attorney, Agent, or Firm*—Robert H. Whisker; Melvin J. Scolnick

[57] ABSTRACT

A system for printing envelopes which includes a laser printer operating under control of a microcomputer. The printer includes a pair of parallel envelope paths for printing pairs of envelopes simultaneously, and also has a capability to print single envelopes as they are transported along the center line of the printer. The microcomputer controls the printer to print sequences of addresses on the envelopes. When envelope are printed in pairs the microcomputer forms subsequences of addresses which are printed on groups of envelopes so that the groups can be concatenated into larger groups with addresses in sequence. Movement through the printer is controlled by pairs of sensor which are "anded" and symmetrically spaced around the center line so that the sensors can control either a pair of envelopes or a single envelope transported along the center line of the printer.

15 Claims, 4 Drawing Sheets

PAPER PATH SCHEMATIC

SYSTEM FOR ADDRESSING ENVELOPES

BACKGROUND OF THE INVENTION

The subject invention relates to a system for addressing envelopes. More particularly it relates to a system including a laser printer or the like operating under control of a micro-computer or the like to print envelopes with addresses.

It is known, as is taught in U.S. Pat. No 4,397,592; to: Brodesser, to print envelopes using a laser printer or the like. In developing the system of the subject invention Applicants have realized that it is desirable to print envelopes in a "two-up" mode. That is to print envelopes two at a time, short edge first. (In general the paper path of a laser/printer is too narrow and the spacing between drive rollers is to great to allow normal envelopes to be fed long edge first.) Such "two-up" printing is known for use with multilith printers and duplicators, which are used to permit sequences of envelopes with identical information. Such "two-up" feeding of envelopes is taught in U.S. Pat. Nos. 4,603,846 and 4,625,651; to: Miles and Jagas, respectively.

When envelopes are printed "two-up" or, more generally, as a succession of pluralities of envelopes, there is a problem in printing a sequence of M addresses and restoring the printed envelopes to the same sequence. This is desirable because the Postal Service allows substantial postage discounts for pre-sorted mail and because it is frequently necessary to match particular contents with corresponding pre-addressed envelopes. If envelopes are printed "two-up" in the most natural way, with one stream consisting of envelopes printed with the even numbered addresses in the sequence and the other printed with the odd numbered sequence of addresses, the envelope steams will have to be merged envelope by envelope to restore the sequence for the printed envelopes. Further, the output of such a printer will generally be to an output stacker having a limited capacity 2N (two stacks of N envelopes, still considering "two-up" printing) where 2N is generally less than M. Thus, the system must suborder the printed envelopes into groups of N envelopes.

Another problem arises because it is also desirable to have a system where a jam or failure to feed on any paper path halts the system. Thus the system controller must provide for sequences of address which are not multiples of the number of paper paths provided since absence of an envelope on any of the paper paths will otherwise appear to be a jam or failure to feed.

Thus it is an object of the subject invention to provide a system for printing envelopes two or more at a time, with a sequence of consecutive addresses in manner such that the printed envelopes can easily be restored to the address sequence.

Other objects and advantages of the subject invention will be apparent from the attached drawing and detailed description set forth below.

BRIEF SUMMARY OF THE INVENTION

The above objects are achieved and the disadvantages of the prior art are overcome in accordance with the subject invention by means of an envelope printing system which includes a printer having the capability to print two or more envelopes simultaneously, and controller for controlling the printer to print a sequence of consecutive addresses on the envelopes. (As used herein the term "sequence of consecutive addresses" means a list of addresses, including return addresses, zip codes, bar codes, etc., which is ordered in accordance with a predetermined rule for determining the position of each address within the list.) The controller further controls the printer to suborder the sequence into two or more subsequences of consecutive addresses and to concurrently print the subsequences on the envelopes to form two or more groups of envelopes printed with consecutive addresses, wherein the size of the groups is determined by the output (or input) capacity of the printer. The subsequences are selected from the sequence so that adjacent groups may be concatenated to form larger groups printing with successive addresses. (As used herein "adjacent groups" are either successively printed groups in the same paper feed path or concurrently printed groups in physically adjacent feed paths.) Thus the groups may be readily combined to conform to the sequence of addresses.

In accordance with one aspect of the subject invention the printer may have multiple sensors for detecting movement of envelopes along the two or more parallel paper paths provided through the printer so that printing stops when there is a jam, or failure to feed in any path. Thus when the total number of addresses is not a multiple of the number of paper paths provided, (i.e. of the number of envelopes which can be printed simultaneously) additional blank envelopes are fed so that the total number of envelopes processed by the printer is an integral multiple of the number of feed paths provided.

DETAILED DESCRIPTION OF PREFERRED EMBODIMENTS OF THE INVENTION

Figure 1:
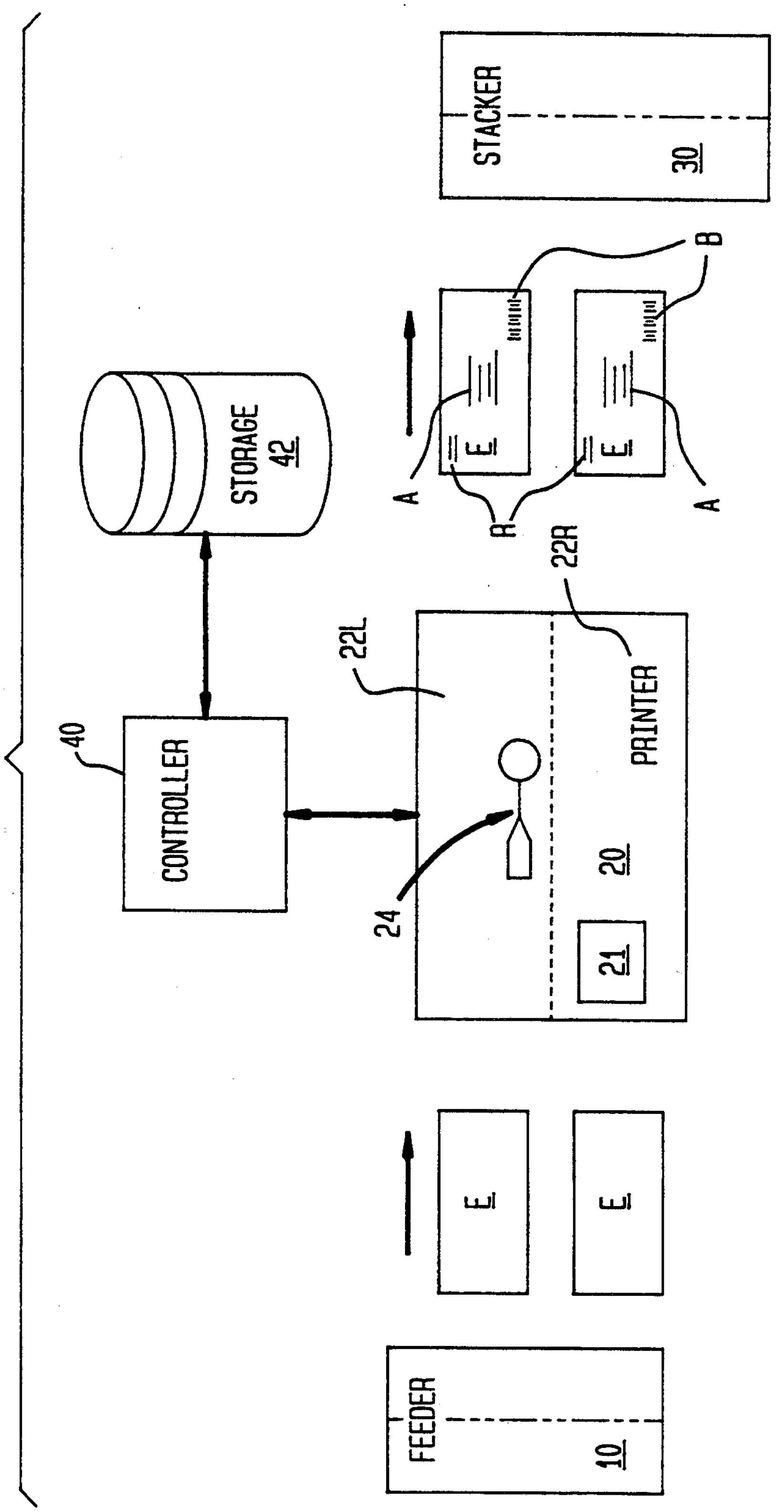
FIG. 1 shows a schematic block diagram of a system in accordance with the subject invention.

FIG. 1 shows a block diagram of a system in accordance with the subject invention, where a substantially conventional envelope feeder 10 is provided to feed envelopes two at a time to a laser printer 20. Feeders for feeding envelopes two at a time, sometimes hereinafter referred to as "two-up" feeding, are known in the art and are described in above referenced U.S. Pat. No. 4,603,846. Applicant notes, however, that where the addresses to be printed include bar code information current Postal Service requirements place tight tolerances on the position of the bar code and modifications may be required to a feeder to meet these tolerance requirements. Such a feeder is described in commonly assigned, Co-pending application Ser. No. 07/643,616 which describes a feeder for feeding single envelopes. Such modifications do not form any part of the subject invention and need not be discussed further here. The envelopes are then printed by laser printer 20, with each envelope being printed with a distinct address selected from an ordered list of address, as will be described further below. One envelope moves along the first, or left, path 22L while the second moves along the second, or right, path 22R. The envelopes are simultaneously printed by a conventional laser print engine in a manner well understood by those skilled in the art, which need not be discussed further here for an understanding of the subject invention. Each envelope is typically printed with a return address R, a destination address A, and the destination zip code in bar code format B, and output to stacker 30. Laser printer 20 is substantially a conventional laser printer, such as a Model No. W100 marketed by Mita Copystar, Inc. under an OEM agreement with the assignee of the present application Modifications to provide two parallel envelope path together with a capability to transport a single sheet or envelope along the center line, will be described more fully below.

Stacker 30 is substantially conventional and is designed to hold two stacks of N envelopes each, for a total capacity of 2N. Typically, 2N will be substantially less than the total number of addresses to be printed, M, so that as stacker 30 fills it will be necessary for an operator to transfer the output stack to a mail tray, or similar container. It is an important feature of the subject invention that these groups of N envelopes be printed in a manner which will allow the operator to readily restore the groups of envelopes to correspond to the original sequence of addresses. (It will clear to those skilled in the art that, for other printer designs, the capacity of the input envelope feeder may be controlling).

Printer 20 is controlled by controller 40, which is typically a microcomputer such as an IBM PC. Controller 40 maintains an address list which is typically stored in a disc storage unit 42, or other equivalent storage medium, and generates an ordered sequence of addresses to be printed in a conventional manner. Software for the maintenance of such address databases and the generation of such ordered address lists is well known and need not be discussed further here for an understanding of the subject invention. One example of such software is marketed by the assignee of the subject application under the trademark "Microfinalist".

Once the list of addresses to be printed is formed controller 40 formats pairs of addresses into a single page and controls printer 20 to print that page in a conventional manner so that one address is printed on the envelope moving along path 22L and the other is printed on the envelope and moving along path 22R, as is shown in FIG. 1. As will be described further below, controller 40 selects these pairs of addresses to form two subsequences and prints corresponding groups of envelopes, one from path 22L and the other from path 22R which may be easily concatenated to form larger groups of sequentially addressed envelopes, which correspond to the original address sequence.

Figure 2:
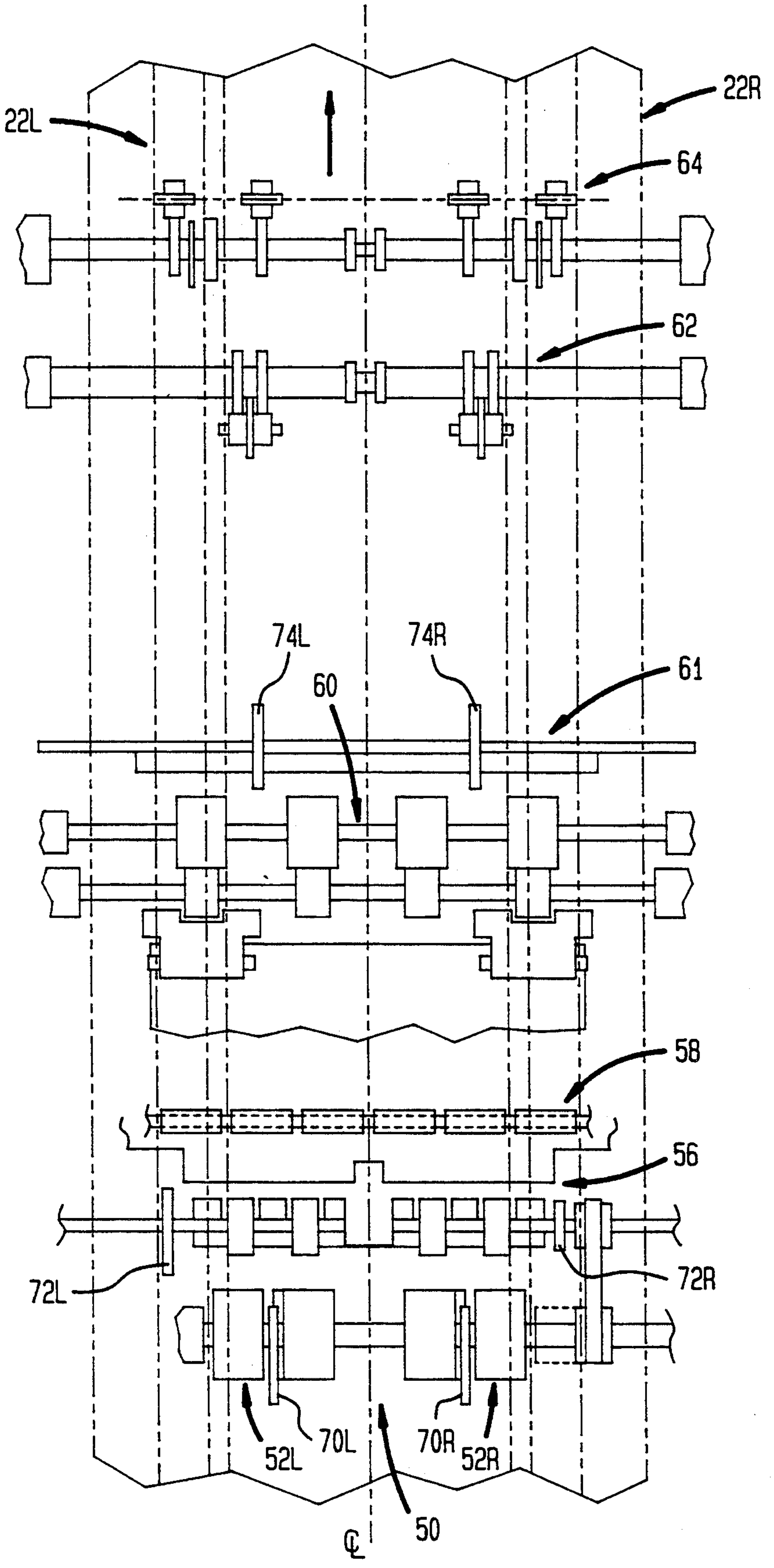
FIG. 2 shows a semi-schematic unfolded plan view, partially broken away, of the paper path through a laser printer, as modified in accordance with the subject invention.

FIG. 2 shows a schematic representation of the paper paths 22L and 22R through laser printer 20. Pick up rollers 52L and 52R pick up the top envelope from each of two stacks of envelopes in a feeder (not shown) and transfer these envelopes to separator assembly 56 which is provided to assure that only a single envelope is feed along each of paths 22L and 22R. The envelopes are then transferred past guide rollers 58 to registration assembly 60. Assembly 60 also provides a second separating action to further assure that only single envelopes are feed along each path. The envelopes are then transferred to registration assembly 61 which is provided to assure that each of the two envelopes is properly lead edge registered before printing. After registration each envelope is simultaneously printed by print engine 24 (shown in FIG. 1) and then transferred for output by feed roller assemblies 62 and 64.

The paper paths through printer 20 also include out of paper sensors 70L and 70R and sensors 72L and 72R, and 74L and 74R to monitor the passing of envelopes along paper paths 22L and 22R, respectively, to detect jams. (One of sensors 74L or 74R is also used to initiate the operation of print engine 24 in synchronism with the movement of the envelopes.) Each of these pairs of sensors is logically "anded" so that if either sensor in a pair is not activated, i.e., either stack is out of envelopes or there is a jam along either paper path, printer 20 senses an error condition, pauses, and waits for operator intervention. Spacing between each pair of sensors is chosen so that both are activated if a single envelope of at least a predetermined width is transported along the center line.

Functions of printer 20 (e.g. print operation, transport, etc.) are locally controlled by controller 21, responsive to sensors 70L and 70R, and 74L and 74R.

Paper Paths 22L and 22R are similar to conventional paper paths through conventional laser printers intended for sheet printing and differ-substantially only by the addition of additional lateral drive points along each drive shaft to assure good drive for both pairs of envelopes and single sheets or envelopes along the center line: and the replacement of single sensors with pairs of logically "anded" sensors, as described above. Accordingly a further description of the movement of envelopes through printer 20 is not believed necessary for an understanding of the subject invention.

Figure 3:
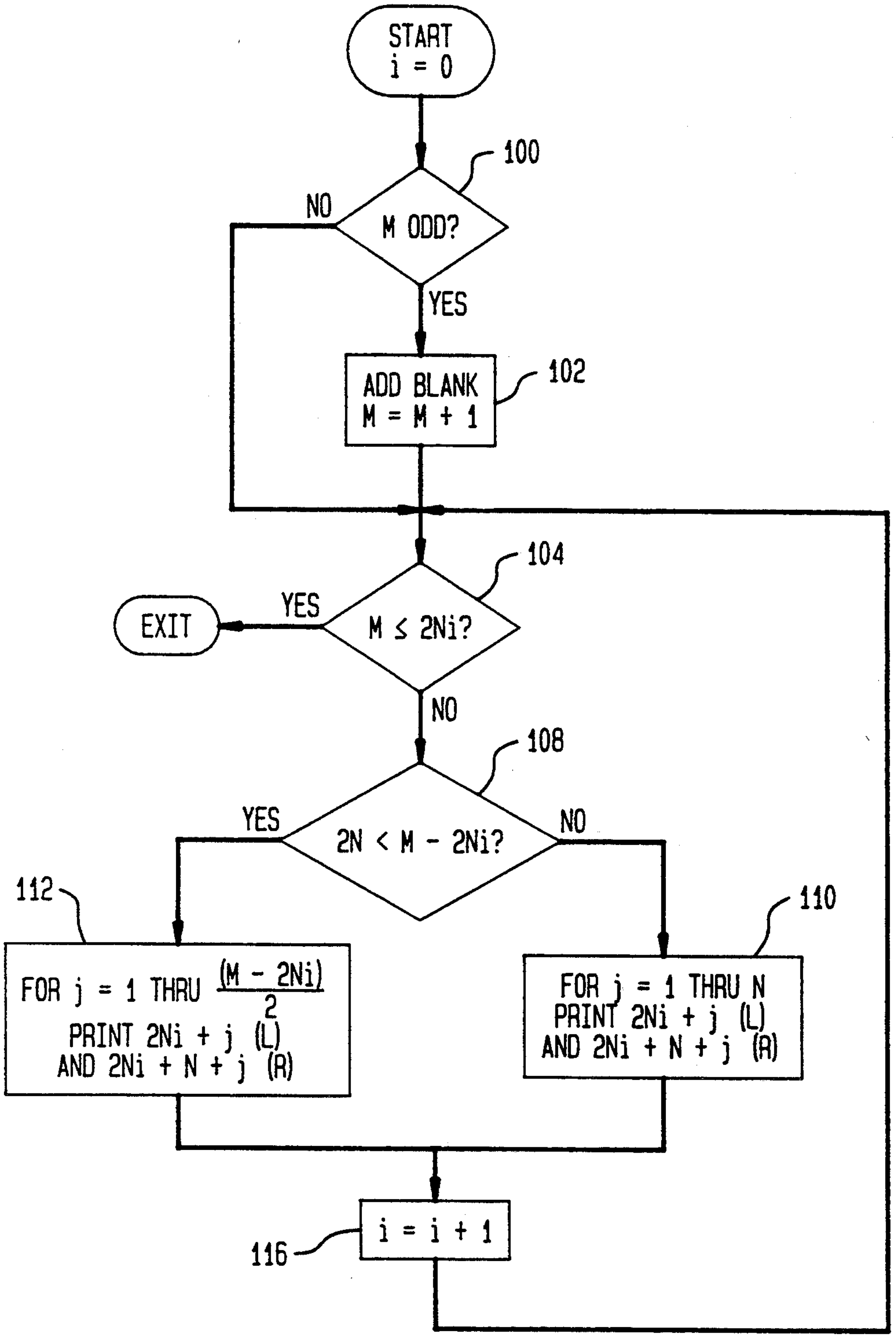
FIG. 3 shows a flow chart of the operation of one embodiment of the subject invention.

FIG. 3 shows a flow chart of the operation of controller 40 in forming subsequences of addresses and controlling printer 20 to print corresponding groups of envelopes. At 100 controller 40 tests if the number of addresses M to be printed is odd. If it is, a blank address it is added to the list and N is set equal to M+1, at 102, and controller 40 continues to decision block 104. If N is even controller 40 goes directly to 104. There the system tests to determine if M is less than or equal to 2Ni, where i is an index representing the number of pairs of subsequences which have been formed and corresponding groups which have been printed. If M is less than or equal to 2Ni then all addresses have been printed and the system exits. Otherwise the system continues to decision block 108 and tests to determine if 2N is less than M−2Ni. If not enough address remain to be printed to print two complete groups of N envelopes and system 40 executes the routine shown in block 110 to form a first string of groups from path 22L having the form:

[1, . . . , N], [2N+1, . . . , 3N], . . . ;

and a second string of groups having the form:

[N+1, . . . , 2N], [3N+1, . . . , 4N], . . . ;

(As used herein to described the form of strings of blocks of envelopes the numbers 1−M represent the positions of corresponding addresses in the sequence so that, for example, "1−N" describes a block of N envelopes printed with the first N addresses, in sequence).

If 2N is less than M−2Ni then at 112 controller 40 follows the routine shown in block 112 to divide the remaining addresses between the last group of each string as shown above.

As can readily be seen as each pair of groups is printed the operator need only first take the left group from paper path 22L, place it in a mail tray or similar container, and then concatenate the second group from 22R with the first group in the mail tray. Repeating this process with all groups produced will restore the printed envelopes to correspond the original sequence of addresses.

At 116 controller 40 increments small i by one and returns to decision block 104.

Figure 4:
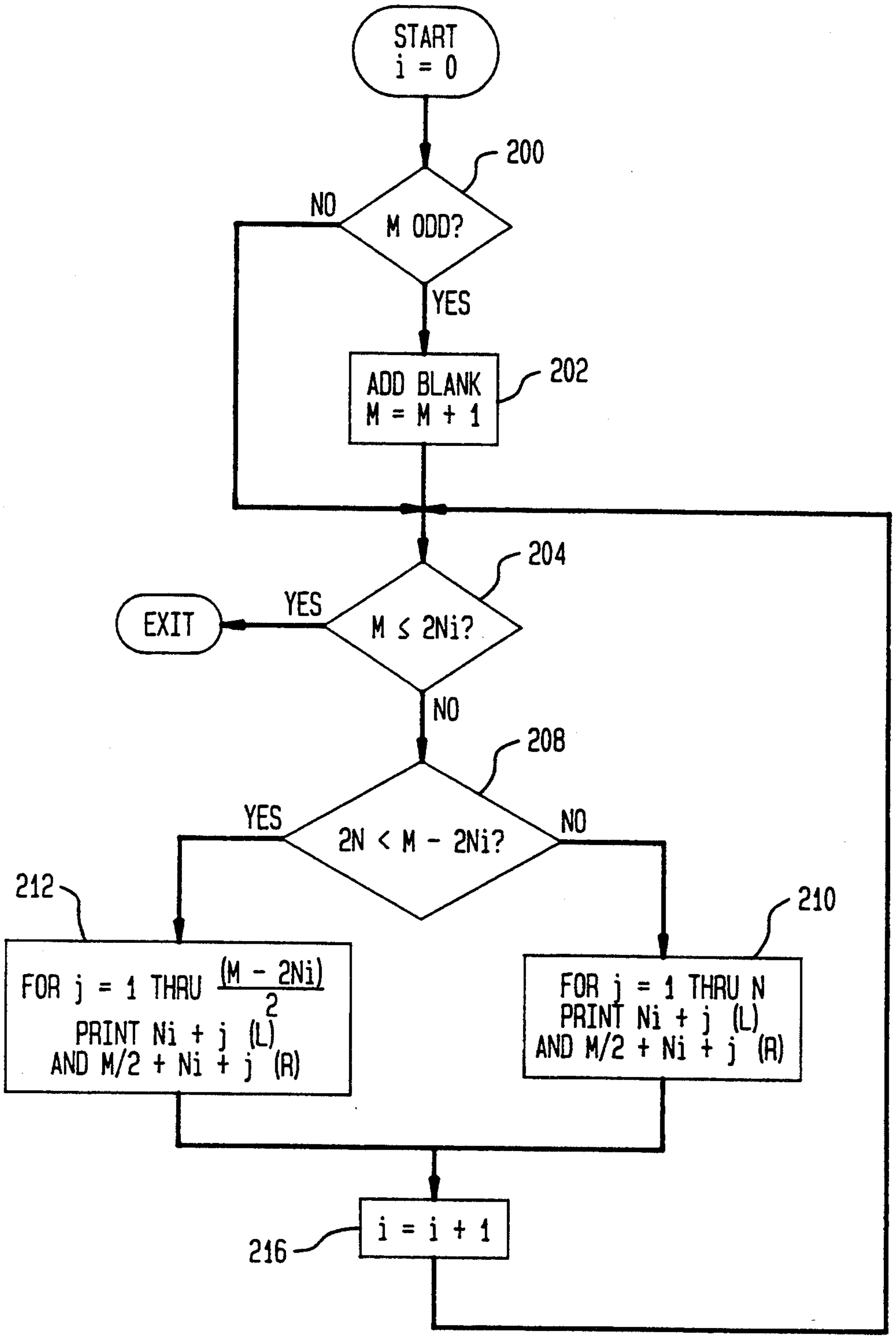
FIG. 4 shows a flow chart of the operation of a second embodiment of the subject invention.

FIG. 4 shows a flow chart of the operation of the system of the subject invention in accordance with a second embodiment.

The operation of controller 40 from blocks 200 through 208 is identical to the operation shown in FIG. 3 for blocks 100 through 108 and repetition of the description provided above is not believed necessary for understanding of the subject invention.

At block 210 controller 40 executes the routine shown to produce a first string of groups in the form:

[1, . . . , N], [N+1, . . . , 2N], . . . IIa . . . [IN+1, . . . , (M'/2)];

and a second string of groups in the form:

[(M'/2)+1, . . . , (M'/2)+N], . . .

. . . [(M'/2)+N+1, . . . , (M'/2)+2N], . . .

. . . [(M'/2)+IN+1−M'];

where I is an integer and M'=M is M is even or M+1 if M is odd.

If at 208 2N is less than M−2Ni then at 212 controller 40 executes the routine shown to divide the remaining addresses between the last groups in the first and second strings, as shown above. Then at 216 controller 40 increments i by one and returns 204.

In the embodiment shown in FIG. 4 a system operator concatenates successive groups from paper path 22L and successive groups from paper path 22R to form two larger groups corresponding to the first and second halves of the original string. These two larger groups may then be in turn concatenated to restore the original sequence.

Those skilled in the art will recognize that it may be desirable for the system to pause after incrementing index i before printing the next group to allow the system operator to clear stacker 30. Also, it may be desirable to first reorder the addresses, as described above, and then proceed to print each string of blocks so defined.

The above descriptions have been provided by way of illustration only and numerous other embodiments of the subject invention will be apparent to those skilled in the art from the detailed description provided above and the attached drawings. Particularly it will be apparent that as printers capable of handling wider stock become available embodiments of the subject invention with more than two paper paths capable of concurrently printing more than two envelopes may be easily achieved. Accordingly limitations on the subject invention are only to be found in the claims set forth below.

What is claimed is:

1. An envelope printing system, comprising a) printing means for simultaneously printing n envelopes; and, b) control means for subordering a sequence of M consecutive addresses into ni subsequences of N consecutive addresses, where i is an integer, N is an integer greater than 1, n is an integer greater than 1, and niN is less than or equal to M, and controlling said printing means to print n selected ones of said subsequences on said envelopes to concurrently form n groups of N envelopes printed with consecutive addresses, wherein, c) said subsequences are selected from said sequence so that adjacent ones of said groups can be concatenated to form larger groups of envelopes printed with consecutive addresses, whereby said groups may readily be combined to correspond to said sequence.

2. A system as described in claim 1 wherein said system includes an output stacker having a capacity to hold n stacks of N envelopes.

3. A system as described in claims 1 or 2 wherein if M is not a multiple of n a number m of blank addresses are added to said sequence where m is such that m plus M is a multiple of n.

4. A system as described in claim 3 wherein n equals 2.

5. A system as described in claim 4 wherein said control means forms first and second strings of subsequences wherein said first string has the form:

[1, . . . , N], [2N+1, . . . , 3N], . . . ;

and said second string has the form:

[N+1, . . . , 2N], [3N+1, . . . , 4N], . . . ;

and wherein if M is not a multiple of 2N any remainder is approximately evenly divided between the last subsequence of said first string and the last subsequence of said second string.

6. A system as described in claim 4 wherein said control means forms first and second strings of subsequences, wherein said first string has the form:

[1, . . . , N], [N+1, . . . , 2N], . . .

. . . [IN+1, . . . , (M'/2)];

and said second string has the form:

[(M'/2)+1, . . . , (M'/2)+N], . . .

. . . [(M'/2)+N+1, . . . , (M'/2)+2N], . . .

. . . [(M'/2)+IN+1−M'];

and wherein I is an integer and M' equals M if M is even and equals M+1 if M is odd.

7. A system as described in claim 1 wherein n equals 2.

8. A system as described in claim 7 wherein said control means forms first and second strings of subsequences wherein said first string has the form:

[1, . . . , N], [2N+1, . . . , 3N], . . . ;

and said second string has the form:

[N+1, . . . , 2N], [3N+1, . . . 4N], . . . ;

and wherein if M is not a multiple of 2N any remainder is approximately evenly divided between the last subsequence of said first string and the last subsequence of said second string.

9. A system as described in claim 7 wherein said control means forms first and second strings of subsequences, wherein said first string has the form:

$$[1, \ldots, N], [N+1, \ldots, 2N], \ldots$$

$$\ldots [IN+1, \ldots, (M'/2)];$$

and said second string has the form:

$$[(M'/2)+1, \ldots, (M'/2)+N], \ldots$$

$$\ldots [(M'/2)+N+1, \ldots, (M'/2)+2N], \ldots$$

$$\ldots [(M'/2)+IN+1-M'];$$

and wherein i is an integer and M' equals M if M is even and equals M+1 if M is odd.

10. A system as described in claim 1 wherein said system includes an output stacker having a capacity to hold n stacks of N envelopes.

11. A printing system for selectively simultaneously printing a pair of envelopes being transported along parallel paper paths through said system, or a single envelope being transported along the center-line of said system, comprising:

a) printing means for printing said envelopes, said printing means further comprising:
  a1) said parallel paper paths symmetrically arranged around said center-line;
  a2) sensor means for sensing the movement of said envelopes along said parallel paper paths;
  a3) said sensor means further comprising a pair of sensors symmetrically arranged around said center line for sensing movement of said pair of envelopes, said pair of sensors being separated by a predetermined distance such that both are activated by said single envelope;
b) control means, responsive to simultaneous activation of said pair of sensors to control said printing means to continue transport of said envelopes, whereby transport of said pair of envelopes is maintained in parallel; and,
c) second control means for selectively controlling said printing means to simultaneously print two addresses on said pair of envelopes or to print one address on said single envelope; and wherein,
d) if said two addresses are printed, said second controller is further for subordering a sequence of M consecutive addresses into 2i subsequences of N consecutive addresses, where i is an integer, N is an integer greater than 1 and 2iN is less than or equal to M, and controlling said printing means to print 2 selected on 2 of said subsequence on successive pairs of said envelopes to concurrently form 2 groups of N envelopes printed with consecutive addresses; wherein,
e) said subsequences are selected from said sequence so that adjacent ones of said groups can be concatenated to form layer groups of envelopes printed with consecutive addresses, whereby said groups may readily be combined to correspond to said sequence.

12. A system as described in claim 11 wherein said system includes an output stacker having a capacity to hold 2 stacks of N envelopes.

13. A system as described in claim 11 or 12 wherein if M is not a multiple of 2 a blank address is added to said sequence n.

14. A system as described in claim 13 wherein said control means forms first and second strings of subsequences wherein said first string has the form:

$$[1, \ldots, N], [2N+1, \ldots, 3N], \ldots;$$

and said second string has the form:

$$[N+1, \ldots, 2N], [3N+1, \ldots, 4N], \ldots;$$

and wherein if M is not a multiple of 2N any remainder is approximately evenly divided between the last subsequence of said first string and the last subsequence of said second string.

15. A system as described in claim 13 wherein said control means forms first and second strings of subsequences, wherein said first string has the form:

$$[1, \ldots, N], [N+1, \ldots, 2N], \ldots$$

$$\ldots [IN+1, \ldots, (M'/2)];$$

and said second string has the form:

$$[(M'/2)+1, \ldots, (M'/2)+N], \ldots$$

$$\ldots [(M'/2)+N+1, \ldots, (M'/2)+2N], \ldots$$

$$\ldots [(M'/2)+IN+1-M'];$$

and where i is an integer and M' equals M if M is even and equals M+1 if M is odd.

* * * * *